(12) United States Patent
Tanaka et al.

(10) Patent No.: US 7,380,740 B2
(45) Date of Patent: Jun. 3, 2008

(54) SEAT BELT RETRACTOR AND SEAT BELT DEVICE

(75) Inventors: Koji Tanaka, Moriyama (JP); Koji Inuzuka, Echi-gun (JP)

(73) Assignee: Takata Corporation, Tokyo (JP)

( * ) Notice: Subject to any disclaimer, the term of this patent is extended or adjusted under 35 U.S.C. 154(b) by 316 days.

(21) Appl. No.: 11/231,863

(22) Filed: Sep. 22, 2005

(65) Prior Publication Data
US 2006/0071111 A1    Apr. 6, 2006

(30) Foreign Application Priority Data
Oct. 4, 2004    (JP)    ............... 2004-291289

(51) Int. Cl.
  *B60R 22/46*    (2006.01)
(52) U.S. Cl. .................. 242/374; 242/390.8; 280/807
(58) Field of Classification Search ............. 242/390.9, 242/374, 390.8; 297/475, 477; 280/801.1, 280/807
See application file for complete search history.

(56) References Cited

U.S. PATENT DOCUMENTS

| | | | |
|---|---|---|---|
| 6,485,057 B1 * | 11/2002 | Midorikawa et al. ....... | 280/807 |
| 6,499,554 B1 * | 12/2002 | Yano et al. ................. | 180/268 |
| 6,626,463 B1 | 9/2003 | Arima et al. | |
| 6,772,973 B2 * | 8/2004 | Fujii et al. ................ | 242/390.8 |
| 2001/0045483 A1 | 11/2001 | Tanaka et al. | |
| 2003/0116956 A1 | 6/2003 | Bullinger et al. | |
| 2005/0011983 A1 | 1/2005 | Inuzuka et al. | |

FOREIGN PATENT DOCUMENTS

| | | |
|---|---|---|
| DE | 41 12 620 A1 | 5/1992 |
| EP | 1 022 201 A1 | 7/2000 |
| EP | 1 475 282 A | 11/2004 |
| GB | 2 304 540 A | 3/1997 |
| JP | 2000-095064 | 4/2000 |
| JP | 2000-177535 | 6/2000 |
| JP | 2002 104135 A | 4/2002 |
| WO | WO 2005/039942 A | 5/2005 |

* cited by examiner

*Primary Examiner*—Peter M. Cuomo
*Assistant Examiner*—Stefan Kruer
(74) *Attorney, Agent, or Firm*—Foley & Lardner LLP (57) ABSTRACT

A seat belt retractor is provided in which two winding performances are achieved while reduced power consumption of a motor and simplified control of the motor are also achieved. A clutch gear is meshed with a carrier gear by rotation of a motor in the normal direction. Accordingly, a low reduction ratio power transmission mode is set so that a seat belt is wound up at a high speed and with low torque. As slack of the seat belt is removed and the belt load increases, the clutch pawl becomes possible to be engaged with the internal gear. As the motor current increases and exceeds a preset value, the motor rotates reversely so that the clutch gear separates from the carrier gear. Therefore, a high reduction ratio power transmission mode is set so that the belt is wound up at a low speed and with high torque.

19 Claims, 5 Drawing Sheets

SEAT BELT RETRACTOR AND SEAT BELT DEVICE

BACKGROUND

The present invention pertains to a technical field of a seat belt retractor which is installed in a vehicle for transportation such as an automobile, an airplane, or a ship (hereinafter, collectively referred to as "vehicle") and which winds up a seat belt for restraining and protecting an occupant by means of a motor and a seat belt device using the same, more particularly, to a technical field of a seat belt retractor in which the winding of a seat belt is performed efficiently by a motor using limited power consumption and a seat belt device using the same.

Conventionally, a seat belt device installed in a vehicle such as an automobile comprises at least a seat belt retractor for winding up a seat belt, a tongue slidably supported to the seat belt, and a buckle to which the tongue can be latched. In the event of emergency such as a vehicle collision at which large deceleration is exerted on the vehicle while an occupant wears the seat belt in a state that the tongue is latched to the buckle, the seat belt device prevents the occupant from jumping out of a vehicle seat by restraining the occupant with the seat belt, thereby protecting the occupant.

The seat belt device is provided with a seat belt retractor for winding up the seat belt. The seat belt retractor comprises a biasing means such as a spiral spring which always biases a spool, on which the seat belt is wound, in the belt-winding direction. When not used, the seat belt is fully wound on the spool by the biasing force of the biasing means. When used, the seat belt is withdrawn against the biasing force of the biasing means and is worn by the occupant. In the seat belt retractor, a locking mechanism is activated in the event of emergency as mentioned above to stop the rotation of the spool in an unwinding direction, thereby preventing the seat belt from being withdrawn. Therefore, the seat belt can securely restrain and thus protect the occupant.

By the way, as one of conventional seat belt devices as mentioned above, a motorized seat belt retractor has been proposed in which, when it is determined that the collision is unavoidable before a vehicle collision, the tension on a seat belt is increased by increasing the driving force of a motor to wind up the seat belt, thereby increasing the restraint force of the occupant and, when the vehicle collision is actually detected, a gas generator for a pretensioner is actuated to generate gas whereby the seat belt is rapidly wound up by the generated gas, thereby further increasing the restraint force for the occupant, as disclosed in Japanese Patent Unexamined Publication 2000-95064 (which is incorporated by reference herein in its entirety).

On the other hand, a seat belt retractor has been also proposed in which, as the power transmission passages for transmitting the rotational torque of the motor, a first power transmission passage for transmitting the rotational torque of a motor to the biasing means as mentioned above to increase the force of the biasing means and a second power transmission passage for transmitting the rotational torque of the motor to the spool at a fixed speed reduction ratio are provided wherein the first power transmission passage is selected by the actuation of a first solenoid and the second power transmission passage is selected by the actuation of a second solenoid, thereby controlling the belt tension, as disclosed in Japanese Patent Unexamined Publication 2000-177535 (which is incorporated by reference herein in its entirety).

By the way, there are various modes of winding up the seat belt such as a mode for rapidly winding up the seat belt for removing slack of the seat belt or for the storage and a mode for winding up the seat belt with large rotational torque for restraining the occupant. The rotational speed of the spool and the belt winding torque on the spool differ according to the mode of winding up the seat belt.

However, in the seat belt retractor disclosed in the aforementioned Japanese Patent Unexamined Publication 2000-95064, the power transmission mechanism transmitting the driving force of the motor to the spool has only one power transmission passage of a fixed speed reduction ratio. Accordingly, the fixed speed reduction ratio is uniquely determined so that it is difficult to flexibly and effectively correspond to the various rotational speed of the spool and the various belt winding torque on the spool.

It is considered, as a way to comply with this, to sensitively control the rotational speed of the motor and the winding-up force of the spool. However, such sensitive control not only makes the control of the motor difficult but also increases the power consumption. It is required to increase the rotational torque of the motor in order to obtain large restraining force in the event of emergency such as a vehicle collision. To increase the rotational torque of the motor, the power consumption must be so large or the size of the motor must be so large.

On the other hand, in the seat belt retractor disclosed in the aforementioned Japanese Patent Unexamined Publication 2000-177535, one power transmission passage is provided for transmitting the rotational torque of the motor to the aforementioned biasing means to control the biasing force of the biasing means, while the other power transmission passage is provided for directly transmitting the rotational torque of the motor to the spool to directly control the winding-up force of the spool by the rotational torque of the motor. Though the seat belt retractor disclosed in Japanese Patent Unexamined Publication 2000-177535 has, as the power transmission passages, two different power transmission passages of different speed reduction ratios, there is only one power transmission passage of a fixed speed reduction ratio for the purpose of directly transmitting the rotational torque of the motor to the spool. Accordingly, similarly to the case of the aforementioned Japanese Patent Unexamined Publication 2000-95064, the fixed speed reduction ratio is uniquely determined for directly transmitting the rotational torque of the motor to the spool so that it is difficult to flexibly and effectively correspond to the various rotational speed of the spool and the various belt winding torque on the spool.

Though the belt winding force can be controlled at some level by controlling the biasing force of the biasing means with the rotational torque of the motor so as to control the belt winding force of the spool according to the controlled biasing force, it is preferable to sensitively control the winding force of the spool by effectively utilizing the rotational torque of the motor.

SUMMARY

One embodiment of the invention relates to a seat belt retractor. The seat belt retractor includes a spool for winding up a seat belt; a motor configured to generate rotational torque for rotating the spool; and a power transmission mechanism configured to transmit the rotational torque of the motor to the spool, the seat belt being wound on the spool by the rotational torque of the motor. The power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque. The seat belt retractor further comprises a power transmission mode switching mechanism that selectively sets the power transmission mechanism into either the low reduction ratio power transmission mode or the high reduction ratio power transmission mode, and a controller configured to control the action of the power transmission mode switching mechanism to switch the mode between the low reduction ratio power transmission mode and the high reduction ratio power transmission mode by controlling the rotational direction of the motor to be changed between the normal direction or the reverse direction.

Another embodiment of the present invention relates to a seat belt device. The seat belt device includes a seat belt retractor configured to wind up a seat belt; a tongue that is slidably supported to the seat belt; and a buckle releasably latched to the tongue. The seat belt retractor includes: a spool for winding up the seat belt; a motor configured to generate rotational torque for rotating the spool; and a power transmission mechanism configured to transmit the rotational torque of the motor to the spool, the seat belt being wound on the spool by the rotational torque of the motor. The power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque. The seat belt retractor further comprises a power transmission mode switching mechanism that selectively sets the power transmission mechanism into either the low reduction ratio power transmission mode or the high reduction ratio power transmission mode, and a controller configured to control the action of the power transmission mode switching mechanism to switch the mode between the low reduction ratio power transmission mode and the high reduction ratio power transmission mode by controlling the rotational direction of the motor to be changed between the normal direction or the reverse direction.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5(a)-5(f) are illustrations for explaining power transmission modes and the mode switching in a power transmission gear mechanism, wherein FIGS. 5(c), 5(d), and 5(e) are illustrations for explaining the respective mode switching.

DETAILED DESCRIPTION

An object of the present invention is to provide a seat belt retractor which can be effectively downsized, achieves the reduction in power consumption of a motor, can simplify the control of the motor, and achieves two winding performances, that is, a performance for rapidly winding up the seat belt for removing slack of the seat belt or for the storage and a performance for winding up the seat belt with large winding force for restraining the occupant and to provide a seat belt device using the same.

It is another object of the present invention to provide a seat belt retractor which is capable of properly and reliably switching between a high-speed low-torque transmission and a low-speed high-torque transmission and to provide a seat belt device using the same To solve the aforementioned problems, a seat belt retractor according to a first embodiment, comprises: a spool for winding up a seat belt; a motor for generating rotational torque for rotating the spool; and a power transmission mechanism for transmitting the rotational torque of the motor to the spool, the seat belt being wound on the spool by the rotational torque of the motor, and is characterized in that the power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque, the seat belt retractor further comprising a power transmission mode switching mechanism which selectively sets the power transmission mechanism into either the low reduction ratio power transmission mode or the high reduction ratio power transmission mode, and a controller for controlling the action of the power transmission mode switching mechanism to switch the mode between the low reduction ratio power transmission mode and the high reduction ratio power transmission mode by controlling the rotational direction of the motor to be changed between the normal direction or the reverse direction.

A seat belt retractor according to a second embodiment of the invention is characterized in that the controller controls the rotational direction of the motor to be changed between the normal direction or the reverse direction based on the motor current to be supplied to the motor.

Further, a seat belt retractor according to a third embodiment of the invention is characterized in that the controller sets the power transmission mechanism to the low reduction ratio power transmission mode when the motor current value is lower than the preset current value, while the controller sets the power transmission mechanism to the high reduction ratio power transmission mode when the motor current value exceeds the preset current value.

Still further, a seat belt retractor according to a fourth embodiment of the invention is characterized in that a mechanism for the high reduction ratio power transmission mode of the power transmission mechanism is composed of a planetary gear train which comprises a carrier, a sun gear, a planet gear, and an internal gear.

Furthermore, a seat belt retractor according to a fifth embodiment of the invention is characterized in that the power transmission mechanism further includes a power transmission insulating mode in which the rotational torque of the motor is not transmitted to the spool, and the power transmission mode switching mechanism selectively sets the power transmission mechanism to either one of the low reduction ratio power transmission mode, the high reduction ratio power transmission mode, and power transmission insulating mode.

Moreover, a seat belt device according to a sixth embodiment of the invention comprises at least: a seat belt retractor for winding up a seat belt, a tongue which is slidably supported to the seat belt, and a buckle to which the tongue can be latched, and is characterized in that the seat belt retractor is a seat belt retractor according to any of the preceding embodiments.

In an embodiment of the seat belt retractor with the aforementioned structure, a high-speed and low-torque power transmission passage and a low-speed and high-torque power transmission passage are set in the power transmission mechanism, whereby the rotational torque of the motor can be transmitted to the spool at a low speed and with high torque or the rotational torque of the motor can be transmitted to the spool at a high speed and with low torque. Therefore, the winding by the spool at the high speed and with the low torque achieves a performance for rapidly winding up the seat belt for removing slack of the seat belt, while the winding by the spool at the low speed and with the high torque achieves a performance for winding up the seat belt with high torque for restraining the occupant.

The realization of the aforementioned two winding performances enables flexible and effective response by simple control without sensitively controlling the rotational torque of the motor according to the performance required for winding up the seat belt.

In addition, the two power transmission passages are provided, thereby enabling the rotational torque of the motor to be efficiently transmitted to the spool and thus ensuring the two winding performances even with limited power consumption. Since the performance for winding up the seat belt with high torque for restraining the occupant can be achieved by the low-speed and high-torque power transmission passage, the rotational torque of the motor required can be smaller than that conventionally required. This can reduce the power consumption of the motor and allows the use of a smaller motor. Therefore, the seat belt retractor can be compact.

The realization of the aforementioned two winding performances gives the pretensioning function by rotational torque of the motor to the seat belt retractor. This can eliminate the necessity of a pretensioner using reaction gas in the conventional seat belt retractor, thereby reducing the cost.

Since the switching between the low reduction ratio power transmission mode and the high reduction ratio power transmission mode is conducted by changing the rotational direction of the motor, it is capable of easily control the action of the power transmission mode switching mechanism for switching among the power transmission insulating mode, the low reduction ratio power transmission mode, and the high reduction ratio power transmission mode and it is also capable of simplifying the structure of the power transmission mode switching mechanism. This can reduce parameters of the mechanical variation and fluctuation during the switching of the power transmission modes and thus stabilize the belt load during the switching. Therefore, more precise and reliable switching of the power transmission modes is achieved.

In embodiments of the seat belt retractor, for example, embodiments two and three, when the switching between the low reduction ratio power transmission mode and the high reduction ratio power transmission mode is conducted by changing the rotational direction of the motor, the inversion operation from the normal rotational direction to the reverse rotational direction is used for switching the low reduction ratio power transmission mode from the ON state to the OFF state so that the timing for switching of the power transmission modes is determined by the current value of the motor correlating to the belt load. Therefore, the parameters of the variation and fluctuation affecting the belt load during the switching of the power transmission modes can be aggregated to the motor current value corresponding to the motor torque. Therefore, more precise and reliable switching of the power transmission modes is achieved.

According to embodiments of the seat belt retractor, for example, embodiments two and three, the power transmission mechanism is set in the low reduction ratio power transmission mode or the high reduction ratio power transmission mode based on the motor current supplied to the motor. Therefore, the switching of modes can be easily conducted without controlling the rotational torque of the motor.

Further in the seat belt retractor according to another embodiment, for example, embodiment four, since the mechanism for the high reduction ratio power transmission mode is composed of a planetary gear train which comprises a carrier, a sun gear, a planet gear, and an internal gear, the low-speed and high-torque transmission passage can be reduced in size. Therefore, even though the power transmission mechanism has both the low reduction ratio power transmission mode and the high reduction ratio power transmission mode, the increase in size of the seat belt retractor can be effectively inhibited.

Further in the seat belt retractor according to another embodiment, for example, embodiment five, since the power transmission mechanism includes the power transmission insulating mode in which the rotational torque of the motor is not transmitted to the spool, the withdrawing of the seat belt, the normal use of the seat belt without discomfort for the occupant, and the storage of the seat belt when not used can be conducted without being influenced by the motor.

Furthermore, in the seat belt device according to yet another embodiment, or for example, embodiment six, since the seat belt device can comprise a seat belt retractor, the rotational torque of the motor is effectively used to sensitively control the winding force of the spool. Therefore, the seat belt device can efficiently restrain and protect an occupant in an automobile, an airplane, or a ship.

Hereinafter, the embodiments of the present invention will be described with reference to the attached drawings.

Figure 1:
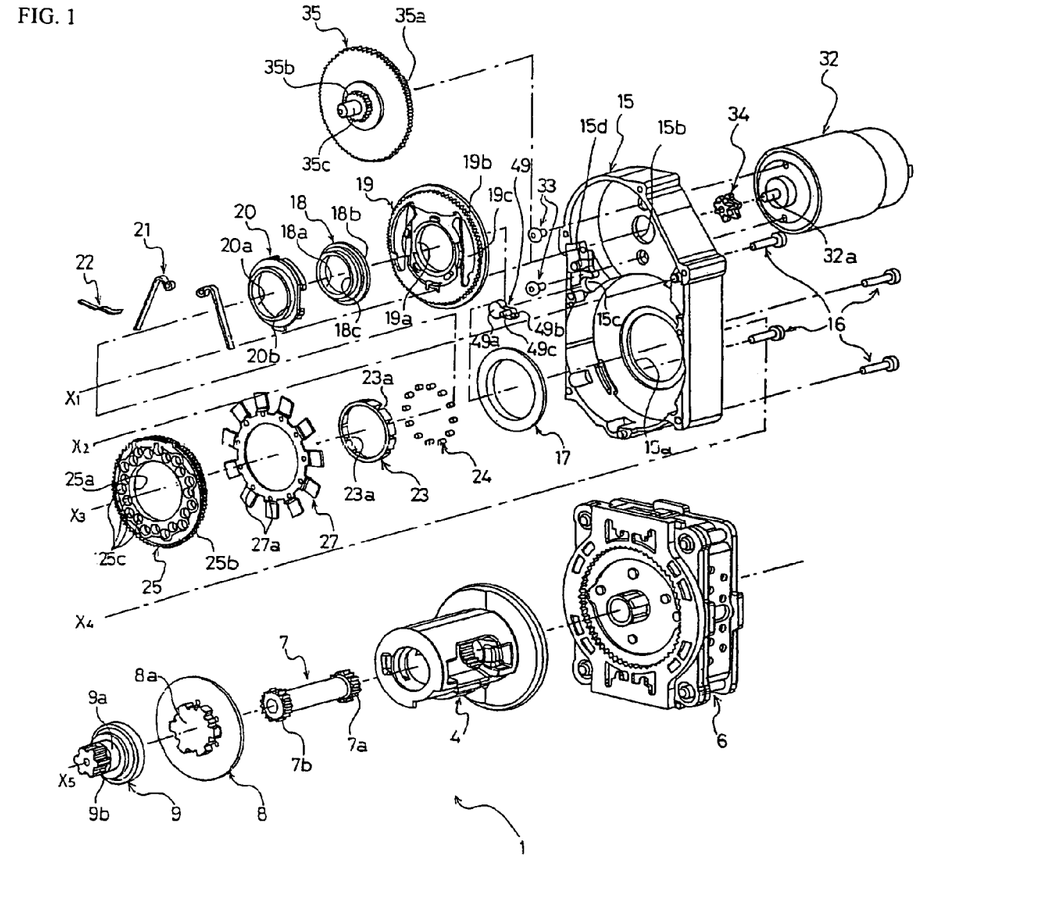
FIG. 1 is an exploded perspective view showing a part of an embodiment of a seat belt retractor.
Figure 2:
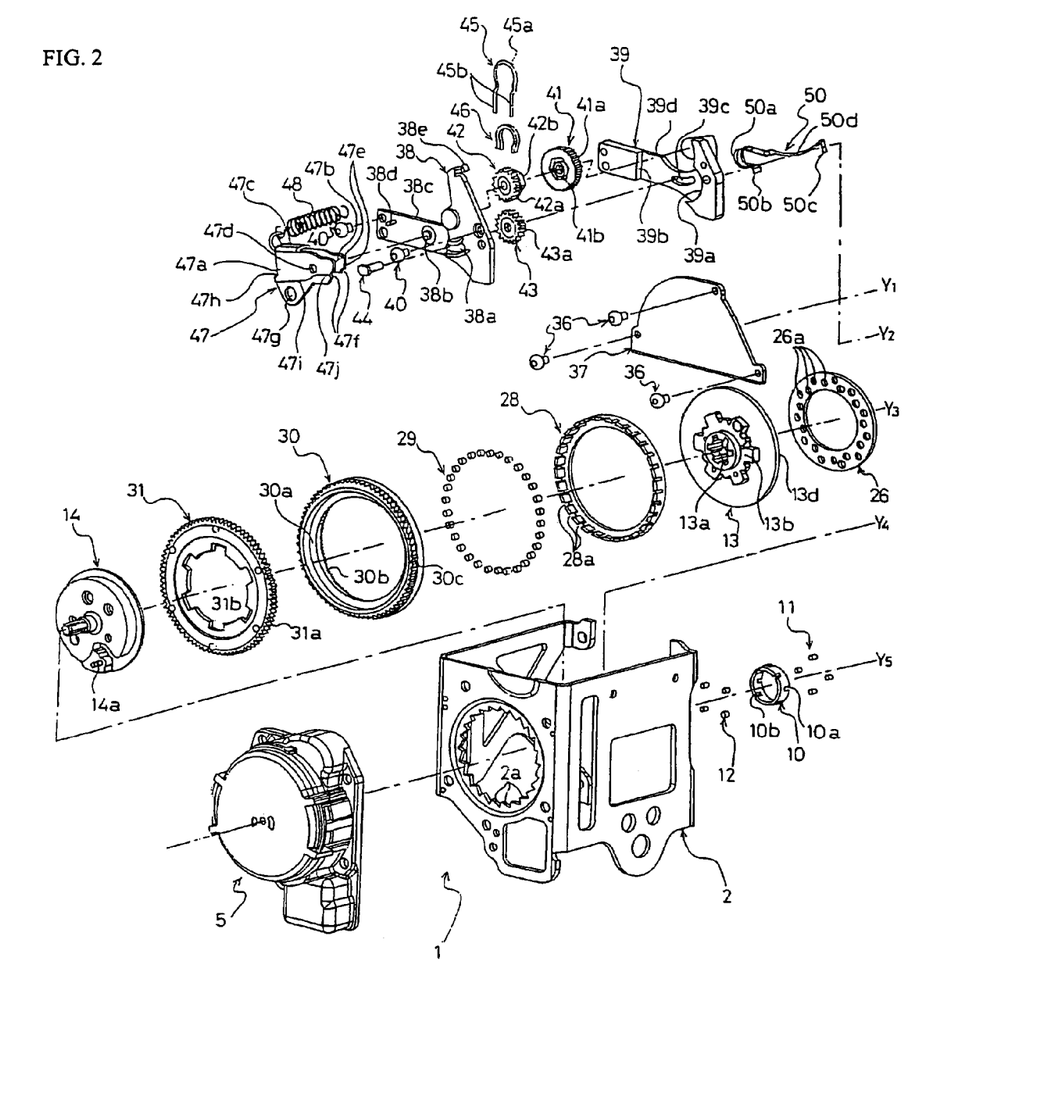
FIG. 2 is an exploded perspective view showing the rest of the embodiment of the seat belt retractor.
Figure 3:
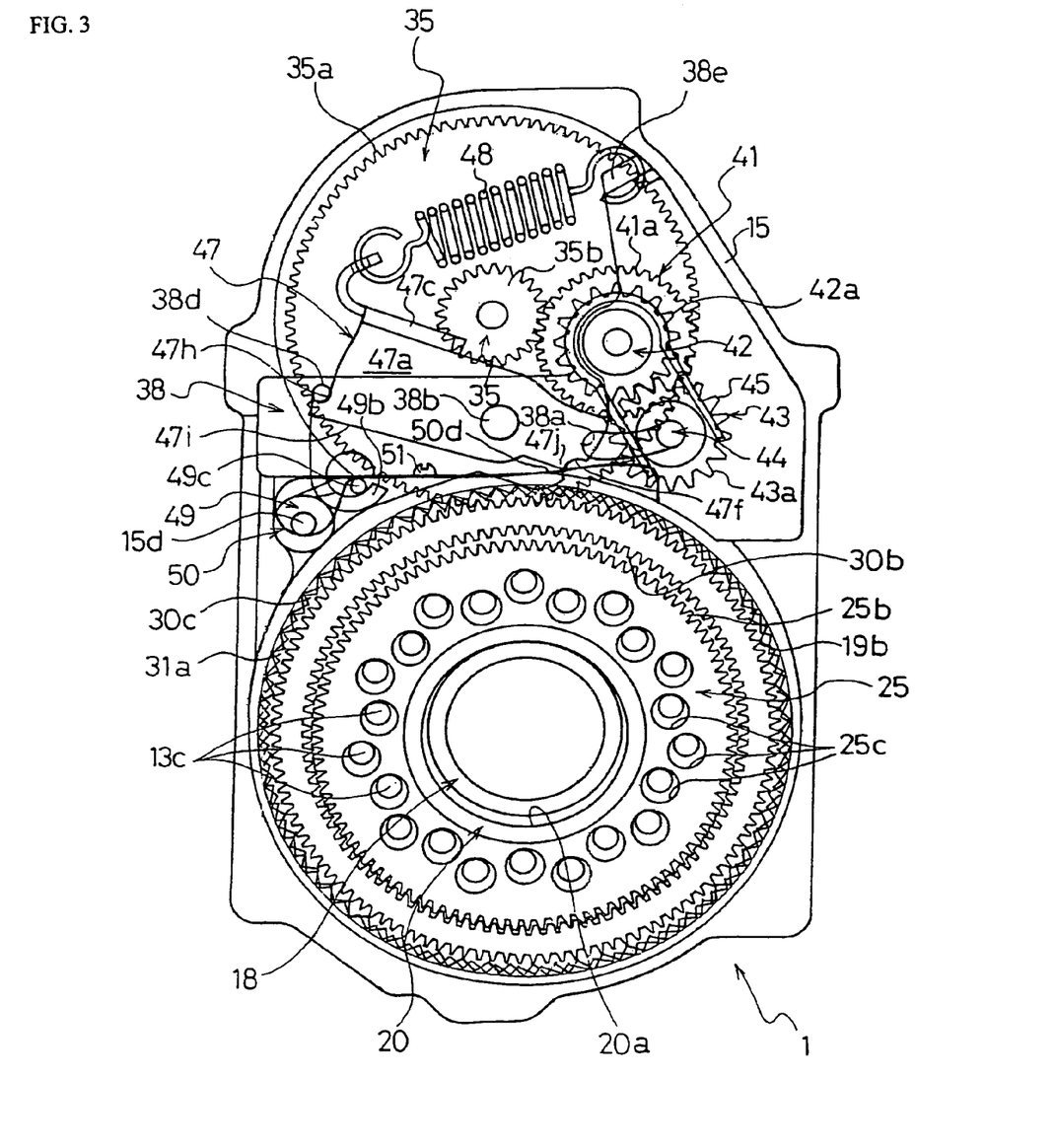
FIG. 3 is an illustration showing the seat belt retractor of the embodiment shown in FIG. 1 and FIG. 2 in a state that a locking unit with return spring and a base frame are detached.

FIG. 1 is an exploded perspective view showing a part of an embodiment of a seat belt retractor according to the present invention, FIG. 2 is an exploded perspective view showing the rest of the embodiment of the seat belt retractor according to the present invention, and FIG. 3 is an illustration showing the seat belt retractor of the embodiment shown in FIG. 1 and FIG. 2 in a state that a locking unit with return spring and a base frame are detached. It should be noted that the seat belt retractor of this embodiment is constructed by aligning lines $X_1$, $X_2$, $X_3$, $X_4$ in FIG. 1 with lines $Y_1$, $Y_2$, $Y_3$, $Y_4$ in FIG. 2, respectively. In the following description, unless stated, "right" and "left" mean the right and the left in drawings used for explanation, and "clockwise" and "counterclockwise" mean "the clockwise" and "the counterclockwise" in drawings used for explanation.

As shown in FIG. 1 and FIG. 2, the seat belt retractor 1 of this embodiment generally comprises a frame 2 having a U-like shape in which a spool 4 for winding up a seat belt 3 for restraining an occupant is rotatably disposed. Disposed outside on one side of the frame 2 is a locking unit 5 with return spring. The locking unit 5 with return spring comprises a locking mechanism which is actuated to stop the rotation of the spool 4 in the belt unwinding direction α when large deceleration larger than a predetermined deceleration value is generated to a vehicle such as at a vehicle collision, and a spring mechanism which always biases the spool 4 in a belt winding direction. Though the locking mechanism and the spring mechanism are not clearly shown in detail, ones of conventionally known types are employed.

A pretensioner 6 is disposed to the outside of the opposite side of the base frame 2 opposite to the side where the locking unit 5 with return spring is disposed. The pretensioner 6 is actuated when large deceleration is generated to the vehicle to rotate the spool 4 in the belt winding direction β to wind up the seat belt 3, thereby removing slack of the seat belt 3 relative to the occupant.

A torsion bar 7 is disposed coaxially with the spool 4 to extend through the inside of the spool 4. One end portion 7a of the torsion bar 7 is fitted to the spool 4 by means of spline such that the torsion bar 7 and the spool 4 can rotate together. The other end portion 7b of the torsion bar 7 is fitted to a fitting portion, not shown, (formed on a side facing the other end portion 7b in FIG. 1 and coaxially with the torsion bar 7) of a disk-like connector 8 by means of spline such that the torsion bar 7 and the connector 8 can rotate together. The connector 8 is provided, on a side opposite to the side facing the torsion bar 7, with a spline shaft 8a coaxially with the torsion bar 7. The spline shaft 8a is fitted into a hole with internal spline (formed in a surface facing the spline shaft 8a in FIG. 1 and coaxially with the torsion bar 7) of a joint member 9 such that the connector 8 and the joint member 9 can rotate together.

The joint member 9 is further provided, on its surface opposite to the surface facing the connector 8, with a cylindrical portion 9a coaxially with the torsion bar 7. To the cylindrical portion 9a, a ring-like first separator 10 is fitted. In this regard, the first separator 10 has a plurality of (four in the illustrated embodiment) axial grooves 10a formed at one side thereof. The same number of bearing pins 11 as the axial grooves 10a are rotatably fitted into the axial grooves 10a, respectively. On the other hand, the first separator 10 also has a plurality of (four in the illustrated embodiment) axial grooves 10b formed at the other side thereof. The same number of bearing pins 12 as the axial grooves 10b are rotatably fitted into the axial grooves 10b, respectively. By these bearing pins 11 and 12, the first separator 10 can rotate relative to the cylindrical portion 9a. The joint member 9 has a spline shaft 9b extending continuously from the cylindrical portion 9a and coaxially with the torsion bar 7. The spline shaft 9b is fitted into an internal spline 13a formed in the inner surface of a disk ring-like carrier 13 coaxially with the torsion bar 7 so that the joint member 9 and the carrier 13 can rotate together.

The carrier 13 is provided, on its surface opposite to the surface facing the torsion bar 7, with a spline shaft 13b formed coaxially with the torsion bar 7. The spline shaft 13b is inserted through an internal spline 31b of a carrier gear 31 as will be described later such that the carrier 13 and the carrier gear 31 can rotate together and is fitted into a hole with internal spline, not shown, (formed in a surface facing the spline shaft 13b in FIG. 2 and coaxially with the torsion bar 7) of a locking base 14 of the locking mechanism in the locking unit 5 with return spring such that the carrier 13 and the locking base 14 can rotate together. As the locking base 14, one of a conventionally known type is employed. The locking base 14 has a pawl 14a which is swingably supported by a pawl supporting portion thereof. The pawl 14a swings when the locking mechanism is activated to engage with one of teeth 2a of the base frame 2, thereby preventing the locking base 14 from rotating in the belt unwinding direction. Therefore, the aforementioned torsion bar 7 is twisted when the locking mechanism is activated, thereby absorbing and reducing the impact energy applied from the seat belt 3 due to the inertia of the occupant.

A retainer 15 is attached, by four mounting screws 16, to an inner surface of the base frame 2 on the side opposite to the side with the pretensioner 6. The retainer 15 has a large-diameter hole 15a to which a ring-like retainer bearing 17 is fitted and fixed. The cylindrical portion 9a of the joint member 9 is rotatably supported by the retainer bearing 17.

The outer periphery of the first separator 10 is fitted into an inner periphery 18a of a ring-like center member 18 via the bearing pins 11, 12 so as to allow relative rotation between the first separator 10 and the center member 18. The center member 18 has a stepped portion 18b which is engaged with three claws 19a of a gear 19, whereby the center member 18 is fixed to the gear 19. The gear 19 is provided with annular external teeth 19b and a guide portion 19c for guiding a sun gear 20 as will be described later in the radial direction (the vertical direction in the state shown in FIG. 1) and movably holding the sun gear 20.

The center member 18 has a second outer periphery 18c to which a central hole 20a of the ring-like sun gear 20 is fitted. In this regard, the diameter of the central hole 20a is set to be larger than the diameter of the second outer periphery 18c and the sun gear 20 is arranged eccentrically relative to the second outer periphery 18c, that is, eccentrically relative to the external teeth 19b of the gear 19. The sun gear 20 is held by a guide portion 19c of the gear 19 allowing the relative movement between the sun gear 20 and the gear 19 in the radial direction. Therefore, the center member 18, the gear 19, and the sun gear 20 rotate together and the sun gear 20 is allowed to move in the radial direction (the vertical direction in FIG. 1) relative to the gear 19. Disposed between the gear 19 and the sun gear 20 are a pair of springs 21 and a receive spring 22. The movement of the sun gear 20 relative to the gear 19 in the radial direction is inhibited by the pair of springs 21.

A second separator 23 is fitted to the outer periphery 20b of the sun gear 20. In this regard, the second separator 23 has a plurality of (12 in the illustrated embodiment) axial grooves 23a formed at one side thereof. The same number of bearing pins 24 as the axial grooves 23a are rotatably fitted into the axial grooves 23a, respectively. By these bearing pins 24, the second separator 23 can rotate relative to the outer periphery 20b of the sun gear 20. In addition, the second separator 23 is fitted into a central hole 25a of an annular planet gear 25 to allow the relative rotation therebetween by the bearing pins 24.

The planet gear 25 is provided on its outer periphery with external teeth 25b and is provided in its surface with a plurality of (22 in the illustrated embodiment) holes 25c axially penetrating which are arranged in zigzag manner in the circumferential direction. Disposed between the carrier 13 and the planet gear 25 is an annular lifter 26. The lifter 26 is provided in its surface with the same number of holes 26a as the number of the holes 25c of the planet gear 25. The holes 26a axially penetrate and are arranged in zigzag manner in the circumferential direction to correspond to the holes 25c, respectively. The planet gear 25 and the lifter 26 are arranged such that projecting pins 13c (shown in FIG. 3) which are formed on a surface opposite to the spline shaft 13b of the carrier 13 to correspond to the holes 25c and 26a are fitted into the holes 25c and 26a. In this regard, the diameter of each hole 25c is set to be larger than the diameter of each projecting pin 13c as shown in FIG. 3 so that the each hole 25c is loosely fitted to the corresponding projecting pin 13c to allow the relative movement therebetween. An annular speed-reduction plate 27 is arranged on a surface opposite to the carrier 13 of the planet gear 25 and is fixed to the carrier 13 by crimping the projecting pins 13c of the carrier 13 to the holes 27a of the annular speed-reduction plate 27. Therefore, the planet gear 25 and the lifter 26 are disposed between the carrier 13 and the speed-reduction plate 27. The planet gear 25 is located eccentrically from the central axis of the carrier 13, i.e., the central axis of the torsion bar 7.

The outer periphery 13d of the carrier 13 is fitted into a third separator 28. In this regard, the third separator 28 has a plurality of (30 in the illustrated embodiment) axial grooves 28a formed at one side thereof. The same number of bearing pins 29 as the axial grooves 28a are rotatably fitted into the axial grooves 28a, respectively. By these bearing pins 29, the third separator 28 can rotate relative to the outer periphery 13d of the carrier 13. In addition, the third separator 28 is fitted into a center hole 30a of an annular internal gear 30 to allow the relative rotation therebetween by the bearing pins 29.

The internal gear 30 is provided with annular inner teeth 30b formed in the center hole 30a at a side facing the retainer 15. When the third separator 28 fitted on the carrier 13 is fitted into the center hole 30a, the planet gear 25 is positioned inside the annular internal teeth 30b eccentrically from the center of the annular internal teeth 30b such that some of the external teeth 25b of the planet gear 25 mesh with some of the internal teeth 30b. The internal gear 30 is further provided with annular ratchet teeth 30c formed on the outer periphery thereof.

Adjacent to the side facing the locking base 14 of the internal gear 30, an annular carrier gear 31 is arranged coaxially with the internal gear 30, that is, coaxially with the torsion bar 7. The carrier gear 31 is provided on its outer periphery with external teeth 31a and is provided at its center with the internal spline 31b. The spline shaft 13b of the carrier 13 is inserted into and engaged with the internal spline 31b. Accordingly, the carrier 13 and the carrier gear 31 can rotate together.

A motor 32 generating rotational torque to be applied to the spool 4 is mounted by mounting screws 33 at a position above the pretensioner 6 and outside of the retainer 15. A motor shaft 32a of the motor 32 enters into the retainer 15 through a through hole 15b of the retainer 15. A rotation transmitting member 34 is attached to the motor shaft 32a inside of the retainer 15 such that the rotation transmitting member 34 and the motor shaft 32a can rotate together. The rotation transmitting member 34 is fitted to a fitting portion, not shown, (arranged on a side facing to the rotation transmitting member 34 in FIG. 1 and coaxially with the motor shaft 32a) of a disk-like motor gear 35 by means of spline such that the rotation transmitting member 34 and the motor gear 35 rotate together.

The Motor gear 35 comprises first external teeth 35a which are arranged in an annular shape having a large diameter, second external teeth 35b which are arranged in an annular shape having a small diameter, and a rotary shaft 35c. The rotary shaft 35c of the motor gear 35 is rotatably supported by a bearing portion (formed on a surface facing the motor gear 35 in FIG. 2 and coaxially with the rotary shaft 35c, that is, coaxially with the motor shaft 32a) of a retainer cover 37 attached to the retainer by mounting screws 36. The first external teeth 35a of the motor gear 35 are meshed with the external teeth 19b of the gear 19, while the second external teeth 35b are meshed with external teeth 41a of a first connecting gear 41 as will be described later.

An upper guide plate 38 and a lower guide plate 39 are superposed on each other and attached to the retainer 15 by mounting screws 40. In this regard, because of stepped portion 39a, 39b formed on the lower guide plate 39, a predetermined space is formed between the upper guide plate 38 and the lower guide plate 39 superposed on each other. In the space, the first connecting gear 41, a second connecting gear 42, and a clutch gear 43 are disposed.

The first connecting gear 41 is provided with on its outer periphery with external teeth 41a and is provided at its center with a fitting hole 41b which has a hexagonal shape as shown in section. The second connecting gear 42 is provided on its outer periphery with external teeth 42a of which diameter is smaller than that of the external teeth 41a and is provided at its center with a fitting shaft 42b which has a hexagonal shape as shown in section. By fitting the fitting shaft 42b of the second connecting gear 42 into the fitting hole 41b of the first connecting gear 41, the first and second connecting gears 41, 42 are combined with each other with a predetermined space therebetween and coaxially with each other such that the first and second connecting gears 41, 42 can rotate together. In addition, the first and second connecting gears 41, 42 are rotatably supported to the upper guide plate 38 and the lower guide plate 39 by a rotary shaft, not shown.

Figure 4:
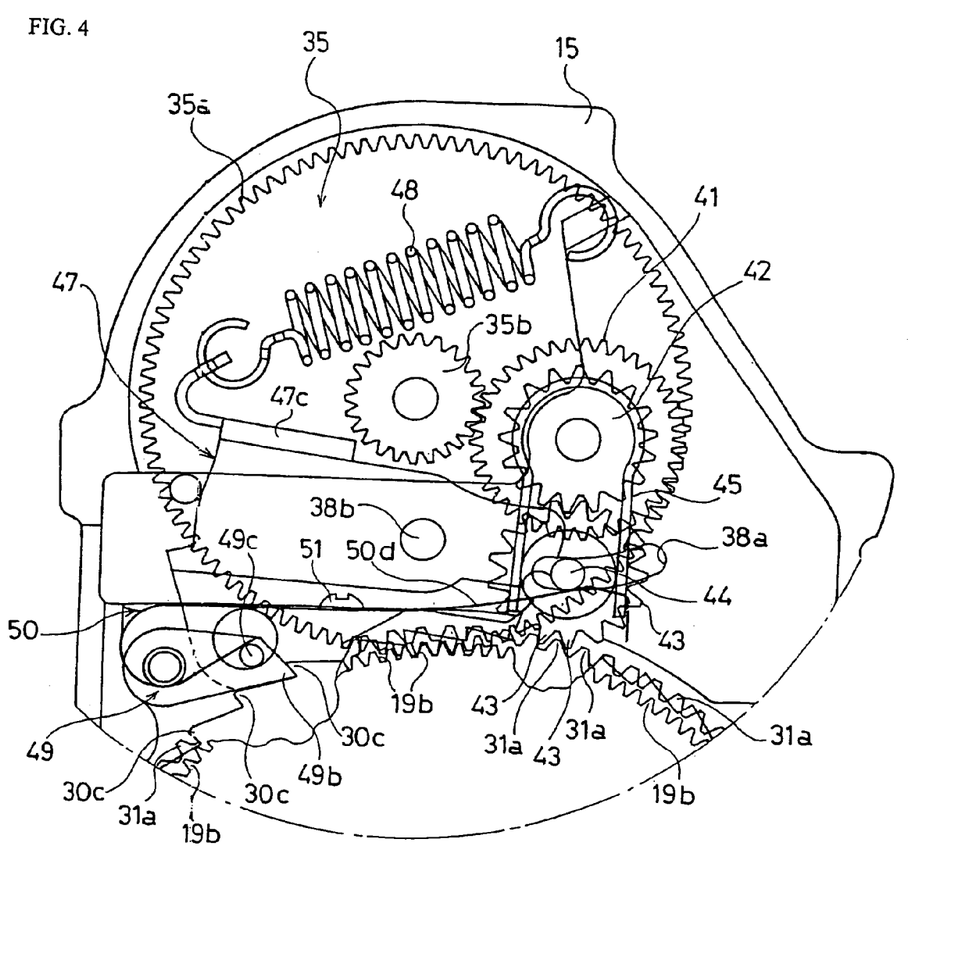
FIG. 4 is an illustration showing the mesh between a clutch gear and a carrier gear and the engagement between the clutch pawl and the ratchet teeth.

The clutch gear 43 is provided on its outer periphery with external teeth 43a of which diameter is substantially the same as that of the external teeth 42a. The external teeth 42a of the second connecting gear 42 and the external teeth 43a of the clutch gear 43 are meshed with each other. The clutch gear 43 is rotatably supported by a clutch gear pin 44. The clutch gear pin 44 is allowed to move along an arc-shaped guide slot 38a formed in the upper guide plate 38 and an arc-shaped guide slot 39c formed in the lower guide plate 39 and is guided by the guide slots 38a and 39c. The guide slots 38a and 39c are aligned in the axial direction. The arcs of the guide slots 38a and 39c are set to be arcs of circles about the rotary shafts of the first and second connecting gears 41, 42. Therefore, the clutch gear 43 rotates about the clutch gear pin 44 with the clutch gear 43 being always meshed with the second connecting gear 42 so that the clutch gear 43 moves around the outer periphery of the second connecting gear 42. As the clutch gear 43 reaches a position shown in FIG. 4 according to the movement as mentioned above, the clutch gear 43 is meshed with the external teeth 31a of the carrier gear 31.

A U-shaped clutch spring 45 is disposed in the space between the first and second connecting gears 41 and 42. A curved portion 45a of the clutch spring 45 is supported onto a projection shaft (not shown), which is formed on the second connecting gear 42 to project toward the first connecting gear 41 in the axial direction, so as to allow the relative rotation therebetween. Accordingly, the clutch spring 45 can rotate about the rotational axis of the second connecting gear 42. In this regard, the curved portion 45a is frictionally engaged with the projection shaft of the second connecting gear 42 by predetermined frictional force. Therefore, as the relative rotational force between the clutch spring 45 and the second connecting gear 42 exceeds a predetermined frictional force, the clutch spring 45 rotates relative to the second connecting gear 42 while the curved portion 45a slides on the projection shaft.

A pair of ends 45b of the clutch spring 45 elastically hold a projection shaft (not shown), which is formed on the clutch gear 43 to project toward the lower guide plate 39 in the axial direction, therebetween. A horseshoe-shaped sliding member 46, which may be made of resin, is also arranged between the clutch spring 45 and the second connecting gear 42. The sliding member 46 inhibits the abrasion between the clutch spring 45 and the second connecting gear 42 during the relative rotation and stabilizes the sliding movement.

A U-shaped clutch arm 47 comprising two side walls 47a, 47b, a connecting portion 47c connecting the walls 47a, 47b is attached to the upper guide plate 38 and the lower guide plate 39. In this regard, the clutch arm 47 is arranged in such a manner that the side walls 47a and 47b sandwich the upper guide plate 38 and the lower guide plate 39 therebetween and supporting holes formed in the side walls 47a and 47b of the clutch arm 47, respectively are fitted to supporting pins formed on the upper guide plate 38 and the lower guide plate 39, respectively, whereby the clutch arm 47 is supported to the upper guide plate 38 and the lower guide plate 39 to allow relative rotation (Though only one supporting hole 47d formed in the side wall 47a and one supporting pin 38b of the upper guide plate 38 are shown in FIG. 2 so that the other supporting hole and the other supporting pin are not shown in FIG. 2, the following description will be made with the supporting hole and the supporting pin which are not shown being marked with 47d and 38b.).

The clutch gear pin 44 can come in contact with right ends 47e of the side walls 47a, 47b of the clutch arm 47. Also at the right ends 47e, arc-shaped engaging concavities 47f for receiving the clutch gear pin 44 are formed. The clutch arm 47 is further provided with a pawl limiting hole 47g formed in the side wall 47a. At the left ends of the side walls 47a, 47b, stopper engaging portions 47h are formed, respectively. As the clutch arm 47 pivots in the clockwise direction, the stopper engaging portions 47h can come in contact with stopper pins formed on the upper guide plate 38 and the lower guide plate 39 (Only a stopper pin 38d of the upper guide plate 38 is shown in FIG. 2 and a stopper pin of the lower guide plate 39 is not shown. However, the following description will be made with the stopper pin of the lower guide plate 39 which is not shown being marked with 38d.).

A spring 48 is compressed and disposed between the connecting portion 47c of the clutch arm 47 and a spring supporting portion 38e of the upper guide plate 38. By the spring 48, the clutch arm 47 is always biased in a direction into the inoperative state shown in FIG. 3, that is, in the clockwise direction. In the inoperative state (initial state) of the clutch arm 47 shown in FIG. 3, the clutch arm 47 is held in a position where the stopper engaging portion 47h is engaged with the stopper pin 38d, thereby preventing the further pivotal movement of the clutch arm 47 in the clockwise direction. As the clutch arm 47 pivots about the supporting pins of the upper guide plate 38 and the lower guide plate 39 in the counter-clockwise direction in FIG. 3 against the biasing force of the spring 48 and the connecting portion 47c thus comes in contact with upper edges 38c, 39d of the upper guide plate 38 and the lower guide plate 39 (the sate shown in FIG. 5(d) as will be described later), the further pivotal movement of the clutch arm 47 in the counter-clockwise direction is prevented.

A clutch pawl 49 is pivotally attached to the retainer 15. In this regard, the clutch pawl 49 is provided at its one end with an arc-shaped supporting portion 49a. The arc-shaped supporting portion 49a is pivotally supported by an arc-shaped supporting concavity 15c of the retainer 15. The clutch pawl 49 is provided at its other end with an engaging claw 49b. The engaging claw 49b can engage with the ratchet teeth 30c of the internal gear 30 when the clutch pawl 49 is positioned in a state shown in FIG. 4 and cannot engage when the clutch pawl 49 is positioned in a state shown in FIG. 3. The clutch pawl 49 is further provided with a cylindrical projection pin 49c which extends through the pawl limiting hole 47g of the side wall 47a. As shown in FIG. 3, the diameter of the projection pin 49c is set to be significantly smaller than the diameter of the pawl limiting hole 47g so that the projection pin 49c is movable within the region of the pawl limiting hole 47g. That is, the pivotal movement of the clutch pawl 49 is limited by the pawl limiting hole 47g.

Further, a stopper spring 50 is attached to the lower guide plate 39. In this regard, as shown in FIG. 3, the stopper spring 50 is fixed to the lower guide plate 39 by a fixing screw 51 as shown in FIG. 3. The stopper spring 50 has an arc-shaped engaging portion 50b formed at its one end. The engaging portion 50b is caught by the projection pin 49c of the clutch pawl 49. The stopper spring 50 is provided at its other end with a curved guide portion 50c which is curved substantially by 90°. Further, the stopper spring 50 has a pressing portion 50d formed between the supporting portion 50a and the guide portion 50c.

In the seat belt retractor 1 assembled as shown in FIG. 3, when the clutch arm 47 is in the inoperative state, the pressing portion 50d of the stopper spring 50 comes in contact with a corner 47j formed in one side wall 47b of the clutch arm 47. Therefore, the clutch arm 47 is biased by the pressing portion 50d of the stopper spring 50 in the counter-clockwise direction. On the other hand, the stopper spring 50 is restricted to a position shown in FIG. 3 by the corner 47j of the clutch arm 47.

In the seat belt retractor 1 of this embodiment, the carrier 13, the center member 18, the gear 19, the sun gear 20, the second separator 23, the planet gear 25, the lifter 26, the third separator 28, the internal gear 30, the carrier gear 31, the motor gear 35, the first connecting gear 41, the second connecting gear 42, the clutch gear 43, the clutch gear pin 44, and the like cooperate together to compose a power transmission gear mechanism for transmitting rotational torque of the motor 32 to the spool 4.

Further, the clutch gear pin 44, the clutch spring 45, the clutch arm 47, the spring 48, the clutch pawl 49, the stopper spring 50, and the like cooperate together to compose a power transmission mode switching mechanism for switching three power transmission modes set in the power transmission gear mechanism. Furthermore, the power transmission gear mechanism and the power transmission mode switching mechanism cooperate together to compose a speed reduction mechanism for reducing the rotational speed of the motor 32 and transmitting the rotation of the motor 32 to the spool 4.

Now, the three power transmission modes set in the power transmission gear mechanism will be described.

Figure 5A:
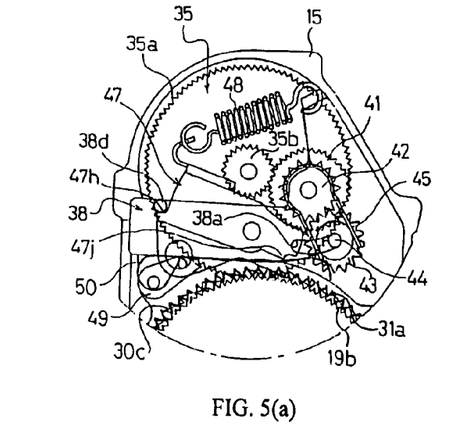
FIG. 5(a) is an illustration schematically and partially showing a power transmission insulating mode.

(1) Power Transmission Insulating Mode:

The power transmission insulating mode is a mode in which the motor 32 is not driven so as to insulate the power transmission between the spool 4 and the motor 32 (the inoperative state, i.e. the initial state). In the power transmission insulating mode, as shown in FIG. 5(*a*) (shown in FIG. 3 is also the power transmission insulating mode), the clutch gear pin 44 in the power transmission mode switching mechanism is set in a position where the clutch gear pin 44 comes in contact with the right ends of the guide slots 38*a* and 39*c* and the clutch gear 43 is set in a position where the clutch gear 43 is not meshed with the carrier gear 31. Therefore, the torque transmission passage between the clutch gear 43 and the carrier gear 31 (the high-speed and low-torque transmission passage as will be described later) is insulated.

The clutch arm 47 is held in a position where the stopper engaging portion 47*h* of the clutch arm 47 is engaged with the stopper pin 38*d* by the spring 48. In the state of the clutch arm 47, the pressing portion 50*d* of the stopper spring 50 is in contact with the corner 47*j* of the clutch arm 47 so that the clutch arm 47 is biased in the counter-clockwise direction by the pressing portion 50*d* and the stopper spring 50 is set at the illustrated position by the clutch arm 47. In addition, the projection pin 49*c* of the clutch pawl 49 is pressed by the inner periphery of the pawl limiting hole 47*g* of the clutch arm 47 so that the engaging claw 49*b* of the clutch pawl 49 is not engaged with the ratchet teeth 30*c* of the internal gear 30 and the internal gear 30 can freely rotate. Accordingly, the torque transmission passage between the motor gear 35 and the carrier 13 (the low-speed and high-torque transmission passage as will be described later) is insulated. Thus, in the power transmission insulating mode, the spool 4 and the motor 32 are not connected to each other.

Figure 5B:
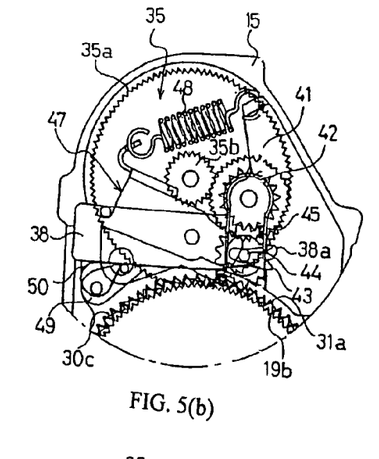
FIG. 5(b) is an illustration schematically and partially showing a low reduction ratio power transmission mode.

(2) Low Reduction Ratio Power Transmission Mode:

The low reduction ratio power transmission mode is a high-speed and low-torque transmission mode which is set when the motor 32 rotates in the belt winding direction (counter-clockwise direction) (hereinafter, sometimes referred to as "rotation in the normal direction"). In the low reduction ratio power transmission mode, similar to the power transmission insulating mode, the engaging claw 49*b* of the clutch pawl 49 is not engaged with the ratchet teeth 30*c* of the internal gear 30 as shown in FIG. 5(*b*) so that the internal gear 30 can freely rotate. Accordingly, the low-speed and high-torque transmission passage is insulated.

On the other hand, the clutch gear pin 44 in the power transmission mode switching mechanism comes in contact with the right ends 47*e* of the side walls 47*a*, 47*b* of the clutch arm 47 so that the clutch gear 43 is meshed with the carrier gear 31. Therefore, the clutch gear 43 and the carrier 13 is connected to each other via the carrier gear 31, whereby the rotation of the motor 32 is transmitted with reducing the rotational speed. In this case, the high-speed and low-torque transmission passage in which the reduction ratio is smaller than the reduction ratio of the high reduction ratio power transmission mode as will be described later is established. That is, the motor 32 is connected to the spool 4 through the motor shaft 32*a*, the rotation transmitting member 34, the second external teeth 35*b* of the motor gear 35, the first connecting gear 41, the second connecting gear 42, the clutch gear 43, the carrier gear 31, the carrier 13, the joint member 9, the connector 8, and the torsion bar 7. In this manner, the low reduction ratio power transmission mode is set. In the low reduction ratio power transmission mode, the driving of the motor 32 is transmitted to the spool 4 at a high speed and with low torque, thereby achieving rapid belt winding.

(3) High Reduction Ratio Power Transmission Mode

Figure 5C:
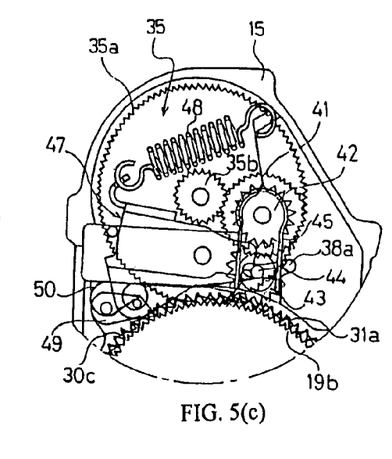

The high reduction ratio power transmission mode is a low-speed and high-torque transmission mode (high-reduction ratio mode; low speed mode) which is set when the motor 32 rotates reversely. In the high reduction ratio power transmission mode, the clutch gear 43 is spaced apart from the carrier gear 31 so as to insulate the low-torque transmission passage as shown in FIG. 5(*e*).

On the other hand, the engaging claw 49*b* of the clutch pawl 49 is engaged with one of the ratchet teeth 30*c* of the internal gear 30 (becomes into the state clearly shown in FIG. 4), thereby preventing the internal gear 30 from rotating by the rotational torque of the motor 32. Therefore, the gear 19 and the carrier 13 are connected to each other via the sun gear 20 and the planet gear 25 so that the rotation of the motor 32 is transmitted to the carrier 13. In this regard, the rotation of the motor 32 is converted to the rotation of the planet gear 25 by a planetary gear mechanism composed of the carrier 13, the sun gear 20, the planet gear 25, and the internal gear 30, whereby the rotation of the motor 32 is transmitted to the carrier 13 after drastically reducing the rotational speed. The reduction ratio of this mode is larger than the reduction ratio of the aforementioned low reduction ratio power transmission mode. Accordingly, the low-speed and high-torque transmission passage is established. That is, the motor 32 is connected to the spool 4 via the motor shaft 32*a*, the rotation transmitting member 34, the first external teeth 35*a* of the motor gear 35, the gear 19, the sun gear 20, the planet gear 25, the carrier 13, the joint member 9, the connector 8, and the torsion bar 7. In this manner, the high reduction ratio power transmission mode is set. In the high reduction ratio power transmission mode, the driving of the motor 32 is transmitted to the spool 4 at a low speed and with high torque, thereby achieving relatively strong, i.e., high belt tension belt winding.

Mode switching among the power transmission insulating mode, the low reduction ratio power transmission mode, and the high reduction ratio power transmission mode is conducted by the power transmission mode switching mechanism. In this regard, the action of the power transmission mode switching mechanism is controlled by the driving of the motor 32 and the driving of the motor 32 is controlled by a motor controller, not shown, based on the motor current detected by a motor current detector, not shown.

(1) Switching from the Power Transmission Insulating Mode to the Low Reduction Ratio Power Transmission Mode As the motor 32 rotates in the normal direction from the state of the power transmission insulating mode shown in FIG. 5(*a*), the rotation in the normal direction of the motor 32 is transmitted to the motor gear 35 so that the motor gear 35 rotates in the counter-clockwise direction. First, the rotation of the counter-clockwise direction of the motor gear 35 rotates the gear 19 in the clockwise direction with reducing the rotational speed. At this point, just like the power transmission insulating mode, the engaging claw 49*b* of the clutch pawl 49 is not engaged with the ratchet teeth 30*c* of the internal gear 30 so that the internal gear 30 rotates freely so as to insulate the low-speed and high-torque transmission passage.

On the other hand, the rotation of the counter-clockwise direction of the motor gear 35 rotates the first connecting gear 41 in the clockwise direction with reducing the rotational speed via the second external teeth 35*b* of the motor gear 35. By the rotation of the first connecting gear 41, the second connecting gear 42 also rotates in the same direction. By the frictional engagement, the clutch spring 45 also rotates in the same direction about the rotational axis of the second connecting gear 42. Accordingly, the clutch gear 43 moves in a direction toward the carrier gear 31. In this case, the clutch gear 43 moves such that the clutch gear pin 44 moves along the guide slots 38a, 39c. By the rotation of the second connecting gear 42, the clutch gear 43 rotates in the counter-clockwise direction.

As the clutch gear 43 moves and the clutch gear pin 44 thus comes in contact with the right ends 47e of the side walls 47a, 47b of the clutch arm 47 as shown in FIG. 5(b), the clutch gear pin 44 and the clutch gear 43 are stopped from moving. Since the right ends 47e of the side walls 47a, 47b are inclined from the lower left to the upper right in FIG. 5(b), the clutch gear pin 44 in contact with the right ends 47e presses the right ends 47e to rotate the clutch arm 47 in the counter-clockwise direction. However, since the force of the clutch gear pin 44 pressing the clutch arm 47 is relatively small so that the torque of moving the clutch arm 47 to pivot in the counter-clockwise direction by the force is smaller than the torque of moving the clutch arm 47 to pivot in the clockwise direction by the spring 48, the clutch arm 47 does not pivot.

In this stopping position, the clutch gear 43 is meshed with the carrier gear 31. In this manner, the switching from the power transmission insulating mode to the low reduction ratio power transmission mode of the power transmission gear mechanism is conducted so that the power transmission gear mechanism is set in the low reduction ratio power transmission mode.

(2) Switching from the Low Reduction Ratio Power Transmission Mode to the High Reduction Ratio Power Transmission Mode As slack of the seat belt 3 is cancelled by the rapid belt winding by the further rotation in the normal direction of the motor 32 from the low reduction ratio power transmission mode shown in FIG. 5(b), the belt load as belt winding resistance on the spool 4 is increased. Then, the increase in the belt load increases the motor current supplied to the motor 32 and increases the rotational torque of the motor 32. Accordingly, the force of the clutch gear pin 44 pressing the clutch arm 47 is increased. As the torque of moving the clutch arm 47 to pivot in the counter-clockwise direction by the force becomes larger than the torque of moving the clutch arm 47 to pivot in the clockwise direction by the spring 48, the clutch arm 47 pivots in the counter-clockwise direction as shown in FIG. 5(c). Then, the corner 47j of the clutch arm 47 moves upwardly, i.e., in a direction away from the pressing portion 50d of the stopper spring 50 so that the pressing portion 50d of the stopper spring 50 also moves upwardly. As the pressing portion 50d of the stopper spring 50 moves upwardly and comes in contact with the clutch gear pin 44, the corner 47j of the clutch arm 47 is separated from the pressing portion 50d of the stopper spring 50.

By the rotation of the clutch arm 47 in the counter-clockwise direction, the force of the clutch arm 47 pressing the projection pin 49c by the spring 48 becomes smaller than the force of the projection pin 49c pressing the clutch arm 47 in the counter direction by the stopper spring 50. Then, the clutch pawl 49 pivots in the clockwise direction by the stopper spring 50 and becomes into a position where the engaging claw 49b of the clutch pawl 49 can engage with the ratchet teeth 30c of the internal gear 30. Since the internal gear 30 rotates in the clockwise direction during the rotation of the motor in the normal direction, however, the engaging claw 49b and the ratchet teeth 30c do not engage with each other.

Figure 5D:
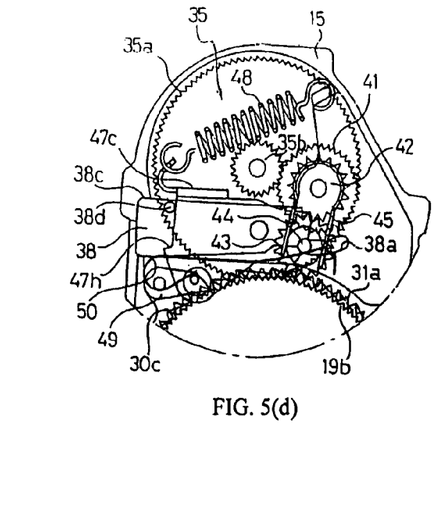
Figure 5E:
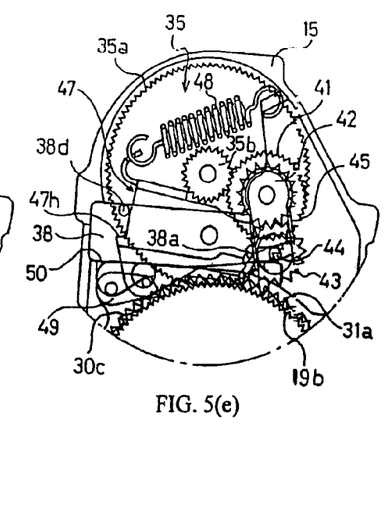
FIG. 5(e) is an illustration schematically and partially showing a high reduction ratio power transmission mode.

As the clutch arm 47 further pivots in the counter-clockwise direction, the projection pin 49c of the clutch pawl 49 separates from the inner periphery of the pawl limiting hole 47g of the clutch arm 47 and the clutch gear pin 44 comes in contact with the left ends of the guide slots 38a, 39c as shown in FIG. 5(d) so that the movement of the clutch gear pin 44 is stopped. Therefore, the rotation of the clutch arm 47 in the counter-clockwise direction is stopped and the clutch gear pin 44 engages with the engaging concavities 47f.

As the motor current detected by the motor current detector exceeds a preset value of current as a threshold, the controller stops the motor 32 a little and then rotates the motor 32 in the reverse direction. Since the first and second connecting gears 41, 42 rotate in the counter-clockwise direction which is a direction opposite to that in the aforementioned case, the internal gear 30 rotates in the counter-clockwise direction so that the engaging claw 49b of the clutch pawl 49 and one of the ratchet teeth 30c of the internal gear 30 engage with each other as shown in FIG. 5(e). Then, the clutch spring 45 also rotates in the counter-clockwise direction so that the clutch gear pin 44 moves along the guide slots 38a, 39c in a direction away from the clutch arm 47 and comes off from the engaging concavities 47f. As the clutch gear pin 44 separates from the engaging concavities 47f, the clutch gear 43 moves in a direction away from the carrier gear 31 so as to cancel the mesh between the clutch gear 43 and the carrier gear 31. As the clutch gear pin 44 comes off from the engaging concavity 47f, the force pressing the clutch arm 47 in the counter-clockwise direction is reduced. Therefore, the clutch arm 47 rotates in the clockwise direction by the spring 48 and the inner periphery of the pawl limiting hole 47g comes in contact with the projection pin 49c of the clutch pawl 49. Since the engaging claw 49b of the clutch pawl 49 engages with one of the ratchet teeth 30c of the internal gear 30 even though the inner periphery of the pawl limiting hole 47g comes in contact with the projection pin 49c, the clutch arm 47 is prevented from further rotating in the clockwise direction and is stopped at this position.

In this manner, the switching from the low reduction ratio power transmission mode to the high reduction ratio power transmission mode of the power transmission gear mechanism is conducted so that the power transmission gear mechanism is set in the high reduction ratio power transmission mode. In the high reduction ratio power transmission mode, as shown in FIG. 5(f), the clutch gear pin 44 further moves and comes in contact with the right ends of the guide slots 38a, 39c to stop so that the clutch gear pin 44, the clutch gear 43, and the clutch spring 45 are all returned to their initial positions.

Figure 5F:
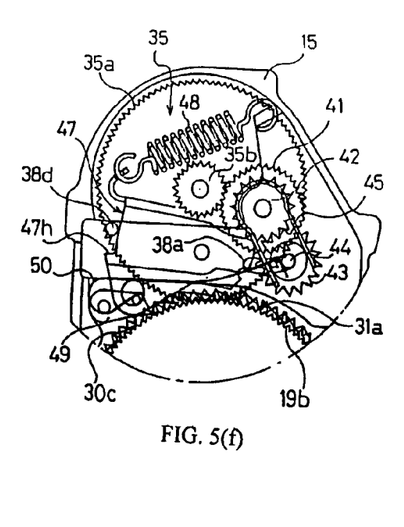

It should be noted that it is possible to switch from the high reduction ratio power transmission mode shown in FIG. 5(f) to the power transmission insulating mode shown in FIG. 5(a) of the power transmission gear mechanism of this embodiment. However, the description about this will be omitted.

The seat belt retractor 1 of this embodiment further has the following seven belt modes of the seat belt 3. In this regard, the motor 32 is controlled by the motor controller so as to set each belt mode.

(1) Belt Storage Mode

The belt storage mode is a belt mode in which the seat belt 3 is not used and is fully wound on the spool 4. In the seat belt retractor 1 set in the belt storage mode, the motor 32 is not driven and the power transmission gear mechanism is set in the power transmission insulating mode. In addition, the power consumption of the motor 32 is zero.

(2) Belt Unwinding Mode

The belt unwinding mode is a belt mode in which the seat belt 3 is withdrawn from the spool 4 for the purpose of putting on the seat belt 3. Also in the seat belt retractor 1 set in the belt-unwinding mode, the power transmission gear mechanism is set in the power transmission insulating mode. Therefore, small force is enough for withdrawing the seat belt 3. In this mode, the motor 32 is not driven and the power consumption is zero.

(3) Belt Winding Mode for Fitting

The belt winding mode for fitting is a belt mode in which, after the seat belt 3 is withdrawn and the tongue is inserted into and latched to the buckle so as to turn on the buckle switch, an excessively withdrawn amount of the seat belt 3 is rewound to fit the seat belt 3 to an occupant or in which, when the occupant moves from the normal used state of the seat belt 3 (the buckle switch is ON) so that a predetermined amount of the seat belt 3 is withdrawn and then the occupant returns to the normal used state, the withdrawn amount of the seat belt 3 is rewound. In the seat belt retractor 1 set in the belt winding mode for fitting, the motor 32 is driven in the belt winding direction and the power transmission gear mechanism is set in the low reduction ratio power transmission mode. Therefore, the seat belt 3 is rapidly wound with low torque and the motor 32 is stopped when a very small belt tension is caused, whereby the seat belt 3 is put to fit the occupant.

(4) Normal Use Mode (Comfort Mode)

The normal use mode (comfort mode) is a belt mode in which the seat belt 3 is in the normal used state and which is set after the belt-winding mode for fitting is finished. In the seat belt retractor 1 set in the normal use mode, the motor 32 is not driven and the power transmission gear mechanism is set in the power transmission insulating mode. Therefore, very small tension acts on the seat belt 3 so that the occupant does not feel discomfort even with the seat belt 3 being put on. In addition, the power consumption is zero.

(5) Warning Mode

The warning mode is a belt mode in which, when the driver falls asleep or an obstacle in front of the vehicle in the forward direction is detected in the normal use mode, the winding action of the seat belt 3 is repeated a predetermined number of times so as to warn the driver. The seat belt retractor 1 set in the warning mode, the motor 32 is set to be repeatedly driven. Therefore, relatively large tension (smaller than the belt tension in an emergency mode as will be described later) and very small tension are alternately applied to the seat belt 3 so that the driver is woken up or warned to the obstacle in front of the vehicle.

(6) Emergency Mode

The emergency mode is a belt mode which is set when the vehicle is highly in danger of colliding with an obstacle during the vehicle runs in the normal use mode and comprises the following two stages.

(i) Initial Stage

In the initial stage of the emergency mode, the motor 32 of the seat belt retractor 1 is driven to rotate in the normal direction. Then, the power transmission gear mechanism is set from the power transmission insulating mode to the low reduction ratio power transmission mode. Therefore, the seat belt 3 is rapidly wound up with the low torque so as to rapidly remove the slack of the seat belt 3.

(ii) Latter Stage

As the slack of the seat belt 3 is removed in the aforementioned initial stage, the emergency mode proceeds to the latter stage in the train of the initial stage. In the latter stage, the tension on the seat belt 3. i.e., the belt load is significantly increased so that the motor current is increased. As the motor current detected by the motor current detector is increased to the preset value of current, the motor 32 stops and then rotates reversely. Thus, the power transmission gear mechanism is set from the low reduction ratio power transmission mode to the high reduction ratio power transmission mode. Therefore, the seat belt 3 is wound up with high torque so as to restrain the occupant with extremely large belt tension.

(7) Belt-winding Mode for Storage

The belt-winding mode for storage is a belt mode in which when the buckle switch is turned off by releasing the tongue from the buckle for the purpose of taking off the seat belt 3, the seat belt 3 is fully wound up so as to make the seat belt 3 into the storage state. In the seat belt retractor 1 set in the belt-winding mode for storage, the controller drives the motor 32 to rotate in the normal direction so that the power transmission gear mechanism is set in the low reduction ratio power transmission mode. Therefore, the seat belt 3 withdrawn is rapidly wound up onto the spool 4 with low torque.

When the seat belt 3 is fully wound up and a very small belt tension is generated, the motor 32 is stopped. Then, the motor 32 is driven to slightly rotate reversely, whereby the seat belt 3 is set from the low reduction ratio power transmission mode to the power transmission insulating mode. Then, the motor 32 is stopped so that the seat belt 3 is set in the belt storage mode.

In the seat belt retractor 1 of this embodiment having the aforementioned structure, the power transmission gear mechanism has two power transmission passages, that is, the low reduction ratio power transmission mode composed of the high-speed and low-torque power transmission passage and the high reduction ratio power transmission mode composed of the low-speed and high-torque power transmission passage, thereby achieving two winding performances, that is, a performance for rapidly winding up the seat belt 3 for removing slack of the seat belt 3 according to the low reduction ratio power transmission mode and a performance for winding up the seat belt with high torque for restraining the occupant according to the high reduction ratio power transmission mode.

When the switching between the low reduction ratio power transmission mode and the high reduction ratio power transmission mode is conducted without changing the rotational direction of the motor 32, a high-speed transmission clutch mechanism, which can accurately correlate with the belt load to switch the low reduction ratio power transmission mode from the ON state to the OFF state, is required to stabilize the seat belt load during the switching. In this regard, the high-speed transmission clutch mechanism must employ a mechanism using a power balance between a member for generating load correlating to the belt load and a member for maintaining high-speed transmission against the former member. However, this mechanism generally must be composed of a combination of the biasing load to the member, the friction between the members, and the acting angle of power between the members. That is, the power balance may change by mechanical variation and fluctuation in constant of spring, coefficient of friction, acting angle of power, and the like. Accordingly, the belt load during the switching may get unstable. On the other hand, in the seat belt retractor 1 of this embodiment, the switching between the low reduction ratio power transmission mode and the high reduction ratio power transmission mode is conducted by changing the rotational direction of the motor 32. Therefore, it is capable of easily control the action of the power transmission mode switching mechanism for switching among the power transmission insulating mode, the low reduction ratio power transmission mode, and the high reduction ratio power transmission mode and it is also capable of simplifying the power transmission mode switching mechanism. This can reduce parameters of the aforementioned mechanical variation and fluctuation during the switching of the power transmission modes and thus stabilize the belt load during the switching. Therefore, more precise and reliable switching of the power transmission modes is achieved.

In addition, when the switching between the low reduction ratio power transmission mode and the high reduction ratio power transmission mode is conducted by changing the rotational direction of the motor 32, the inversion operation from the normal rotational direction to the reverse rotational direction is used for switching the low reduction ratio power transmission mode from the ON state to the OFF state so that the timing for switching of the power transmission modes is determined by the current value of the motor correlating to the belt load. Therefore, the parameters of the mechanical variation and fluctuation affecting the belt load during the switching of the power transmission modes can be aggregated to the motor current value corresponding to the motor torque. Therefore, more precise and reliable switching of the power transmission modes is achieved.

In addition, the two power transmission passages are provided, thereby enabling the rotational torque of the motor 32 to be efficiently transmitted to the spool 4 and thus ensuring the two winding performances even with limited power consumption. Since the performance for winding up the seat belt with high torque for restraining the occupant can be achieved by the low-speed and high-torque power transmission passage, the rotational torque of the motor 32 required can be smaller than that conventionally required. This can reduce the power consumption of the motor 32 and allows the use of a smaller motor. Therefore, the seat belt retractor 1 can be compact.

The realization of the aforementioned two winding performances gives the pretensioning function by the rotational torque of the motor 32 to the seat belt retractor 1. This can eliminate the necessity of a pretensioner using reaction gas in the conventional seat belt retractor, thereby reducing the cost.

Since the power transmission gear mechanism is set in the low reduction ratio power transmission mode or the high reduction ratio power transmission mode based on the motor current supplied to the motor 32, the switching of modes can be easily conducted without controlling the rotational torque of the motor 32.

Further, since the power transmission gear mechanism has the power transmission insulating mode in which the rotational torque of the motor 32 is not transmitted to the spool 4, the withdrawing of the seat belt 3, the normal use of the seat belt 3 without discomfort for the occupant, and the storage of the seat belt 3 when not used can be conducted without being influenced by the motor 32.

Furthermore, since the winding action for storage of the seat belt 3 is conducted only by the rotational torque of the motor 32, the necessity of a winding means such as spiral spring can be eliminated or the biasing force of the winding means in the belt winding direction which always acts on the seat belt 3 can be set to be very small without using an additional module such as a tension reducer.

In this case, even when the biasing force by the winding means is set in a minimum range for the action of fitting the seat belt 3 to the occupant when the occupant puts on the seat belt 3, the rotation of the motor 32 is transmitted to the spool 4 in the low reduction ratio power transmission mode so as to assist the winding of the seat belt 3, thereby securing the performance of the winding action for storage of the seat belt 3.

Since the mechanism for the high reduction ratio power transmission mode is composed of a planetary gear train which comprises the carrier 13, the sun gear 20, the planet gear 25, and the internal gear 30, the low-speed and high-torque transmission passage can be reduced in size. Therefore, even though the power transmission gear mechanism has both the low reduction ratio power transmission mode and the high reduction ratio power transmission mode, the increase in size of the seat belt retractor 1 can be effectively inhibited.

The switching of the power transmission modes is conducted by inversing the rotational direction of the motor 32 from the normal direction to the reverse direction when the motor current value exceeds the preset current value as the threshold in the aforementioned embodiment. However, the switching of the power transmission modes may be conducted by the inversing the rotational direction of the motor 32 from the normal direction to the reverse direction when a preset time period elapses after the motor current value exceeds a preset current value. This can inhibit the timing for the inversion of the motor from being misjudged, thereby conducting further precise switching of the power transmission modes.

For switching the power transmission modes, another mechanism such as a solenoid as disclosed in Japanese Patent Unexamined Publication 2000-177535 may be used besides the power transmission mode switching mechanism employing two torques, i.e. the low torque and the high torque, of the motor 32.

Though the rotational torque of the motor 32 is constant during the switching of the power transmission modes as mentioned above, the rotational torque of the motor 32 may be controlled to be varied according to the mode among the belt-winding mode for fitting, the warning mode, the emergency mode, and the belt-winding mode for storage.

The seat belt retractor of the present invention can be suitably employed as a seat belt retractor to be used in a seat belt device which is installed in a vehicle for transportation such as an automobile, an airplane, or a ship and which winds up a seat belt for restraining and protecting an occupant by means of a motor.

The seat belt device of the present invention can be suitably employed as a seat belt device which efficiently restrains and protects an occupant in an automobile, an airplane, or a ship by effectively using the rotational torque of a motor to control the winding force for a spool sensitively.

Japanese Priority Application 2004-291289, filed Oct. 4, 2004 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor, comprising:
a spool for winding up a seat belt;
a motor configured to generate rotational torque for rotating the spool; and
a power transmission mechanism configured to transmit the rotational torque of the motor to the spool, the seat belt being wound on the spool by the rotational torque of the motor,
wherein the power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque,
wherein the seat belt retractor further comprises a power transmission mode switching mechanism that selectively sets the power transmission mechanism into either the low reduction ratio power transmission mode or the high reduction ratio power transmission mode, and
a controller configured to control the action of the power transmission mode switching mechanism to switch the mode between the low reduction ratio power transmission mode and the high reduction ratio power transmission mode by controlling the rotational direction of the motor;
wherein the controller controls the action of the power transmission mode switching mechanism by changing the rotational direction of the motor between a normal direction and a reverse direction.

2. The seat belt retractor according to claim 1, wherein the controller controls the rotational direction of the motor to be changed between the normal direction or the reverse direction based on a motor current to be supplied to the motor.

3. The seat belt retractor according to claim 1, wherein a mechanism for the high reduction ratio power transmission mode of the power transmission mechanism includes a planetary gear train that comprises a carrier, a sun gear, a planet gear, and an internal gear.

4. The seat belt retractor according to claim 1, wherein the power transmission mechanism further includes a power transmission insulating mode in which the rotational torque of the motor is not transmitted to the spool, and
the power transmission mode switching mechanism selectively sets the power transmission mechanism to either one of the low reduction ratio power transmission mode, the high reduction ratio power transmission mode, and power transmission insulating mode.

5. The seat belt retractor according to claim 2, wherein the controller sets the power transmission mechanism to the low reduction ratio power transmission mode when the motor current value is lower than a preset current value, while the controller sets the power transmission mechanism to the high reduction ratio power transmission mode when the motor current value exceeds the preset current value.

6. The seat belt retractor according to claim 4, wherein when the power transmission mechanism is in the power transmission insulating mode, a torque transmission passage between a clutch gear and a carrier gear is insulated.

7. A seat belt device, comprising:
a seat belt retractor configured to wind up a seat belt;
a tongue that is slidably supported to the seat belt; and
a buckle releasably latched to the tongue,
wherein the seat belt retractor includes:
a spool for winding up the seat belt;
a motor configured to generate rotational torque for rotating the spool; and
a power transmission mechanism configured to transmit the rotational torque of the motor to the spool, the seat belt being wound on the spool by the rotational torque of the motor,
wherein the power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque,
wherein the seat belt retractor further comprises a power transmission mode switching mechanism that selectively sets the power transmission mechanism into either the low reduction ratio power transmission mode or the high reduction ratio power transmission mode, and
a controller configured to control the action of the power transmission mode switching mechanism to switch the mode between the low reduction ratio power transmission mode and the high reduction ratio power transmission mode by controlling the rotational direction of the motor;
wherein the controller controls the action of the power transmission mode switching mechanism by changing the rotational direction of the motor between a normal direction and a reverse direction.

8. The seat belt device according to claim 7, wherein when the power transmission mechanism is in low reduction ratio power transmission mode, the motor rotates in a belt winding direction and an internal gear freely rotates, thus, a low speed and high torque transmission passage is insulated.

9. The seat belt device according to claim 7, wherein the seat belt retractor includes a belt winding mode for fitting in which the seat belt is withdrawn, the tongue is latched to the buckle and an excessively withdrawn amount of the seat belt is rewound and the power transmission mechanism is set in the low reduction ratio power transmission mode.

10. The seat belt device according to claim 7, wherein the seat belt retractor includes a warning mode in which a winding action of the seat belt is repeated a predetermined number of times in which alternating high and low tension is applied to the seat belt.

11. The seat belt device according to claim 7, wherein the seat belt retractor includes an emergency mode in which the power transmission mechanism switches from a power transmission insulating mode, to the low reduction ratio power transmission mode and is then switched into the high reduction ratio power transmission mode.

12. A seat belt device, comprising:
a seat belt retractor configured to wind up a seat belt;
a tongue that is slidably supported to the seat belt; and
a buckle releasably latched to the tongue,
wherein the seat belt retractor includes:
a spool for winding up the seat belt;
a motor configured to generate rotational torque for rotating the spool; and
a power transmission mechanism configured to transmit the rotational torque of the motor to the spool, the seat belt being wound on the spool by the rotational torque of the motor, wherein the power transmission mechanism includes a low reduction ratio power transmission mode in which the rotational torque of the motor is transmitted to the spool at a high speed and with low torque and a high reduction ratio power transmission mode in which the rotational torque of the motor is transmitted to the spool at a low speed and with high torque, wherein the seat belt retractor further comprises a power transmission mode switching mechanism that selectively sets the power transmission mechanism into either the low reduction ratio power transmission mode or the high reduction ratio power transmission mode, and a controller configured to control the action of the power transmission mode switching mechanism to switch the mode between the low reduction ratio power transmission mode and the high reduction ratio power transmission mode by controlling the rotational direction of the motor;

wherein the controller controls the action of the power transmission mode switching mechanism by changing the rotational direction of the motor between a normal direction and a reverse direction;

wherein when the power transmission mechanism is in low reduction ratio power transmission mode, the motor rotates in a belt winding direction and an internal gear freely rotates, thus, a low speed and high torque transmission passage is insulated.

13. The seat belt device according to claim 12, wherein the power transmission mechanism further includes a power transmission insulating mode in which the rotational torque of the motor is not transmitted to the spool.

14. The seat belt device according to claim 13, wherein the seat belt retractor includes a belt storage mode in which the seat belt is fully wound on the spool and the power transmission mechanism is set in the power transmission insulating mode.

15. The seat belt device according to claim 13, wherein the seat belt retractor includes a belt unwinding mode in which the seat belt is withdrawn from the spool and the power transmission mechanism is set in the power transmission insulating mode.

16. The seat belt device according to claim 13, wherein the seat belt retractor includes a normal use mode that follows after the belt winding mode for fitting and the power transmission mechanism is set in the power transmission insulating mode.

17. The seat belt device according to claim 12, wherein the controller controls the rotational direction of the motor to be changed between the normal direction or the reverse direction based on a motor current to be supplied to the motor.

18. The seat belt device according to claim 17, wherein the controller sets the power transmission mechanism to the low reduction ratio power transmission mode when the motor current value is lower than a preset current value, while the controller sets the power transmission mechanism to the high reduction ratio power transmission mode when the motor current value exceeds the preset current value.

19. The seat belt device according to claim 12, wherein a mechanism for the high reduction ratio power transmission mode of the power transmission mechanism includes a planetary gear train that comprises a carrier, a sun gear, a planet gear, and an internal gear.

* * * * *